United States Patent
Tanahashi et al.

(10) Patent No.: US 6,759,148 B2
(45) Date of Patent: Jul. 6, 2004

(54) PERPENDICULAR MAGNETIC RECORDING MEDIA AND MAGNETIC STORAGE APPARATUS USING THE SAME

(75) Inventors: Kiwamu Tanahashi, Kokubunji (JP); Atsushi Kikugawa, Higashimurayama (JP); Yukio Honda, Fuchu (JP); Masaaki Futamoto, Shiroyama (JP); Akira Ishikawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 09/785,416

(22) Filed: Feb. 20, 2001

(65) Prior Publication Data

US 2002/0048693 A1 Apr. 25, 2002

(30) Foreign Application Priority Data

Sep. 1, 2000 (JP) ........................... 2000-266093

(51) Int. Cl.[7] ................. G11B 5/62; G11B 10/08; G11B 10/12; G11B 10/14
(52) U.S. Cl. ................. 428/694 T; 428/694 TM; 428/694 TS
(58) Field of Search ................. 428/694 T, 694 TS, 428/694 TM, 688, 457

(56) References Cited

U.S. PATENT DOCUMENTS 5,738,927 A * 4/1998 Nakamura et al. .......... 428/141
5,851,643 A * 12/1998 Honda et al. ............... 428/212
6,221,508 B1 * 4/2001 Kanbe et al. ............... 428/617
6,387,483 B1 * 5/2002 Hokkyo et al. ............. 428/332
6,475,611 B1 * 11/2002 Chen .......................... 428/213
2002/0012816 A1 * 1/2002 Shimizu et al. ...... 428/694 TM
2002/0064690 A1 * 5/2002 Chen et al. ............ 428/694 TS

FOREIGN PATENT DOCUMENTS

| JP | 58077025 A | 5/1983 |
|---|---|---|
| JP | 58141435 A | 8/1983 |
| JP | 60064413 A | 4/1985 |
| JP | 60214417 A | 10/1985 |
| JP | 1-503262 | 11/1989 |
| JP | 07-129946 | 5/1995 |
| JP | 11-306532 | * 5/1999 |
| JP | 11191217 A | 7/1999 |
| JP | 2000030236 A | 1/2000 |
| WO | WO 89/03112 | 4/1989 |

* cited by examiner

*Primary Examiner*—Paul Thibodeau
*Assistant Examiner*—Nikolas J. Uhlir
(74) *Attorney, Agent, or Firm*—Kenyon & Kenyon

(57) ABSTRACT

A double layer perpendicular magnetic recording medium having a high medium S/N ratio at a recording density of 50 Gb/in$^2$ or higher and a magnetic storage apparatus with a lower error rate and excellent reliability are obtained with a structure having soft magnetic underlayer 12, an intermediate layer 13 and a perpendicular magnetic recording layer 14 are sequentially formed on a substrate 11. The, intermediate layer 13 is made to be a non-magnetic amorphous alloy, in which Ni is a main component and Zr is contained, and the soft magnetic underlayer 12 is constituted of ferromagnetic nano-crystals precipitated by annealing.

1 Claim, 7 Drawing Sheets

PERPENDICULAR MAGNETIC RECORDING MEDIA AND MAGNETIC STORAGE APPARATUS USING THE SAME

BACKGROUND OF THE INVENTION

1. Field of the Invention

The present invention relates to a magnetic storage apparatus and a magnetic storage medium, particularly to a magnetic storage apparatus having a recording density of 50 Gb/in$^2$ or higher and a magnetic storage medium to achieve the recording density.

2. Description of the Related Prior Art

In recent years, an amount of information handled by computers has been steadily increased, and a larger capacity and higher transfer rate are more and more required of a magnetic disk storage device of an external storage device. So far, a magnetic disk storage device having the maximum recording density of 10 Gb/in$^2$ class has been commercialized. This kind of magnetic disk storage device adopts a longitudinal magnetic recording method. However, influence of a so called thermal fluctuation has become conspicuous, in a state where a magnetic energy possessed by becoming extremely fine recording bits decreases as the recording density increases and a recorded magnetization is reversed due to demagnetizing field working at a bit-transition and ambient heat. Therefore, it is considered to be difficult to attain an areal recording density exceeding 40 Gb/in$^2$ in the conventional longitudinal magnetic recording method that uses a recording layer of a Co alloy series.

On the other hand, a perpendicular magnetic recording method is a magnetic recording method, in which magnetization is formed in a direction perpendicular to the surface of a recording medium film and such that adjacent recording bits become antiparallel to each other. Unlike the longitudinal magnetic recording method, the perpendicular magnetic recording method has a small demagnetizing field at the bit-transition, and has a characteristic that the magnetization is stably maintained as the recording density becomes higher. Accordingly, the perpendicular magnetic recording method is considered as one of the strong means for attaining a high recording density that exceeds the thermal fluctuation limit of the current longitudinal magnetic recording method. Media used in the perpendicular magnetic recording method are classified into two types; one is a single layer perpendicular magnetic recording medium having a perpendicular magnetic recording layer formed on a substrate via a non-magnetic underlayer, and the other is a double layer perpendicular magnetic recording medium where a soft magnetic underlayer is formed on a substrate and the perpendicular magnetic recording layer is formed on the soft magnetic underlayer directly or via a non-magnetic intermediate layer. In the single layer perpendicular magnetic recording medium, a ring-type head similar to the one used in the current longitudinal magnetic recording medium is generally used. However, since a gradient of a magnetizing field of the perpendicular magnetic recording is not steep, there is a problem that resolution is not improved. On the other hand, in the double layer perpendicular magnetic recording medium, a single pole type head can be utilized, where a strong magnetizing field of the perpendicular magnetic recording and a steep gradient of magnetizing field are obtained. As a result, it is advantageous that the resolution is improved in comparison with the single layer perpendicular magnetic recording medium. For this reason, a combination of the double layer perpendicular magnetic recording medium and the single pole type head is considered to be effective for commercializing the perpendicular magnetic recording method.

The double layer perpendicular magnetic recording medium can obtain the high resolution, but on the contrary, noise originated in the soft magnetic underlayer is problematic, in addition to noise originated in the recording layer, which can be seen in the single layer perpendicular magnetic recording medium as well. The noise is classified into a spike noise and a transition noise; the former occurs from a magnetic domain wall of the soft magnetic underlayer and the latter occurs by fluctuation of a magnetization transition in the recording layer owing to a magnetization state of the soft magnetic underlayer. With regard to the former spike noise, for example, as disclosed in Japanese Patent Laid-open No. 7(1995)-129946 gazette and Japanese Patent Laid-open No. 11(1999)-191217 gazette, there is a method where a hard-magnetic pinning layer is provided between the soft magnetic underlayer and the substrate to control a magnetic domain structure of the soft magnetic underlayer, thereby the spike noise is reduced. On the other hand, the latter transition noise is observed in a state of superposing the transition noise originated in the recording layer itself. Therefore, details are not yet clear as to how much the magnetization state of the soft magnetic underlayer influences the fluctuation of the magnetization transition in the recording layer.

When it is considered that the perpendicular magnetic recording method in the combination of the double layer perpendicular magnetic recording medium and the single pole type head is applied at the recording density exceeding the thermal fluctuation limit of the longitudinal magnetic recording method, both of a medium noise originated in the recording layer and the medium noise originated in the soft magnetic underlayer need to be reduced. The present invention has been created to solve the above-described problems. More specifically, the object of the present invention is to provide the perpendicular magnetic recording medium having a high medium S/N ratio at the recording density of 50 Gb/in$^2$ or higher, and to facilitate the achievement of a high density magnetic storage device.

SUMMARY OF THE INVENTION

Reduction of the medium noise originated in the recording layer is attained, in the perpendicular magnetic recording medium where the soft magnetic underlayer, the intermediate layer and the perpendicular magnetic recording layer are sequentially deposited on the substrate, by forming the intermediate layer with a non-magnetic amorphous alloy, in which Ni is made to be a main component and Zr is contained. Herein, the term "amorphous" means that a broad peak is observed by a thin-film X-ray diffraction, or that a halo pattern is observed by an electron diffraction.

Heretofore in the single layer perpendicular magnetic recording medium, to improve a perpendicular orientation of the perpendicular magnetic recording layer, there has been considered a method of providing the underlayer of non-magnetic material between the perpendicular magnetic recording layer and the substrate. For example, methods of using the non-magnetic material underlayer are disclosed in: Japanese Patent Laid-open No. Sho 58(1983)-77025 and No. Sho 58(1983)-141435 gazettes in which Ti is used as the underlayer of a Co—Cr perpendicular magnetic recording layer; Japanese Patent Laid-open No. Sho 60(1985)-214417 gazette in which Ge and Si are used as the underlayer; Japanese Patent Laid-open No. Sho 60(1985)-064413 gazette in which an oxide such as CoO and NiO is used as the underlayer; and Japanese Patent Laid-open No. 2000-30236 gazette in which MgO is used.

When the present inventors considered applying such non-magnetic underlayer materials for the intermediate layer of the double layer perpendicular magnetic recording medium, various problems have become clear. In the double layer perpendicular magnetic recording medium, since the intermediate layer is formed on the soft magnetic underlayer, a microstructure of the intermediate layer receives an influence in the case where poly-crystalline materials such as Ni—Fe and Fe—Al—Si and where amorphous materials such as Co—Nb—Zr and Co—Ta—Zr are used for the soft magnetic underlayer. As a result, the c-axis vertical orientation and the magnetic property of the perpendicular magnetic recording layer change significantly. For example, when Ti is used for the intermediate layer, although it shows a relatively good property on the amorphous soft magnetic underlayer, the c-axis vertical orientation of the perpendicular magnetic recording layer is degraded on the poly-crystalline soft magnetic underlayer, there is seen a tendency that a sufficient magnetic property cannot be obtained. In addition, in the double layer perpendicular magnetic recording medium, it is effective that a film thickness of the intermediate layer is made to be thinner in order to increase recording and reproduction efficiency. However, for example, when the amorphous material such as Ge is used for the intermediate layer, it is difficult to make the intermediate layer thin because diffusion easily occurs at the interface.

The present inventors, after considering various materials for the intermediate layer to be formed between the soft magnetic underlayer and the perpendicular magnetic recording layer, found out the following. When the non-magnetic amorphous alloy is used, in which Ni is made to be a main component and Zr is contained, the perpendicular orientation of the perpendicular magnetic recording layer becomes strong and small crystal grains are obtained (regardless of) whether the microstructure of the soft magnetic underlayer is poly-crystalline or amorphous. With a composition of the intermediate layer of an Ni—Zr series alloy, the above-described effect is obtained when the layer is non-magnetic and amorphous. By adding at least one kind of element of Nb and Ta, the non-magnetic and amorphous intermediate layer can be formed under various film forming processing conditions. When the intermediate layer of the present invention is used, a change of magnetic property owing to the film thickness of the intermediate layer is small, and deterioration of the magnetic property is not seen even in the case where the film thickness is as thin as 2 nm. In other words, an influence of the structure and magnetization of the soft magnetic underlayer to the perpendicular magnetic recording layer can be efficiently cut off. The reason is considered that the material for the intermediate layer of the present invention has a smaller interfacial diffusion and a higher covering ratio in comparison with the amorphous material such as Ge, Si and C. The film thickness of the intermediate layer is preferably 2 nm or more and 20 nm or less in order to break a magnetic coupling between the soft magnetic underlayer and the perpendicular magnetic recording layer, and to increase the recording-reproduction efficiency. Moreover, the material for the intermediate layer of the present invention can be also used for the underlayer of the single layer perpendicular magnetic recording medium.

Reduction of the medium noise originated in the soft magnetic underlayer is attained, in the perpendicular magnetic recording medium where the soft magnetic underlayer, the intermediate layer and the perpendicular magnetic recording layer are sequentially formed on the substrate, by constituting the soft magnetic underlayer with ferromagnetic nano-crystals precipitated by annealing.

Heretofore, as the material for the soft magnetic underlayer, the poly-crystalline materials such as Ni—Fe and Fe—Al—Si and the amorphous materials such as Co—Nb—Zr and Co—Ta—Zr have been proposed. The present inventors found out that the spike noise seen in the conventional soft magnetic underlayer materials can be reduced and the transition noise originated in the soft magnetic underlayer can be also reduced when a material is used for the soft magnetic underlayer, the material such is substantially amorphous and has a small saturation magnetic flux density at the time of film forming, in which ferromagnetic nano-crystals are precipitated and a high saturation magnetic flux density is obtained by annealing. As a precipitated ferromagnetic nano-crystal, any of α-Fe, fcc-Co and hcp-Co is effective, but α-Fe is the most desirable because a low coercivity and a high saturation magnetic flux density can be easily obtained. For example, when the soft magnetic underlayer is adopted where the α-Fe nano-crystals were precipitated, elements and compositions of the soft magnetic underlayer materials are not specifically limited as long as the materials precipitate the α-Fe nano-crystals. Specific examples of the materials are an Fe—Ta—C alloy, an Fe—Hf—C alloy, an Fe—Zr—C alloy, an Fe—Nb—C alloy, an Fe—Ti—C alloy and the like. When any of these materials is used and annealing suitable for each of the materials is performed, α-Fe nano-crystals can be uniformly precipitated. Moreover, the α-Fe nano-crystals can be also obtained by sputtering an Fe—Ta alloy or an Fe—Hf alloy in an Ar/$N_2$ mixed gas.

Generally speaking, the soft magnetic underlayer can be made to be the one that contains Fe as a first element, at least one of C and N as a second element, and at least one kind of element selected from Ta, Hf, Nb, Ti and Zr as a third element. The soft magnetic underlayer has a small spike noise even if it is directly used. However, when a pinning layer utilizing an interlayer anti-ferromagnetic coupling or a ferromagnetic coupling is provided between the soft magnetic underlayer and the substrate to control the magnetic domains, the spike noise is more effectively reduced.

As the perpendicular magnetic recording layer to be used for the perpendicular magnetic recording medium of the present invention, a Co—Cr—Pt alloy, a Co—Cr—Pt—Ta alloy, a Co—Cr—Pt—B alloy and the like can be used. As a protective layer of a perpendicular magnetic recording layer, a film having a film thickness of 3 nm or more and 10 nm or less with carbon as a main component is formed, in addition, a lubricant layer such as perfluoroalkylpolyether or the like is formed in the film thickness of 1 nm or more and 10 nm or less. Thus, a highly reliable perpendicular magnetic recording medium is obtained.

In the magnetic storage apparatus of the present invention comprising: the above-mentioned perpendicular magnetic recording medium; a driver to drive the medium in a recording direction; a magnetic head consisting of a recording section and a reproduction section; means for allowing the magnetic head to have a relative movement for the perpendicular magnetic recording medium; and recording-reproduction processing means for performing signal input to the magnetic head and reproduction of output signal from the magnetic head, the reproduction section of the magnetic head is constituted of a high-sensitive sensor utilizing any one of a giant magnetoresistive effect and a tunneling magnetoresistive effect. With this constitution, the magnetic storage apparatus having a high reliability at the recording density of 50 Gb/in$^2$ or higher can be achieved.

DETAILED DESCRIPTION OF THE INVENTION

The following embodiments will be given to illustrate the present invention with reference to the drawings.

[Embodiment 1]

Figure 1:
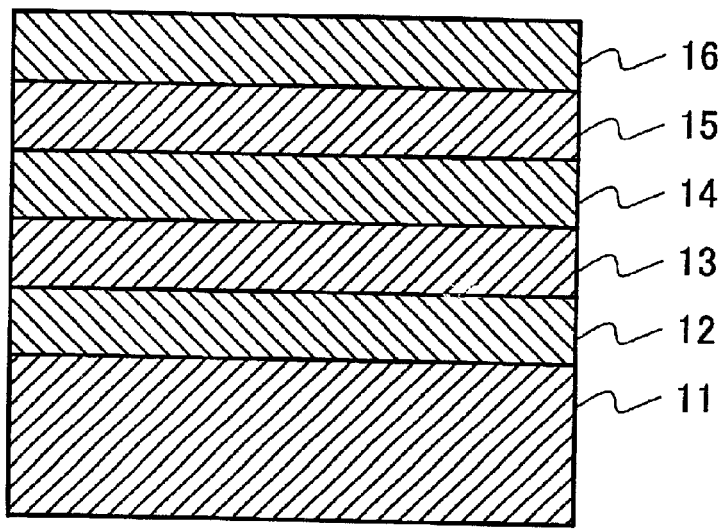
FIG. 1 is a view illustrating a layer constitution of a perpendicular magnetic recording medium of one embodiment of the present invention.

FIG. 1 shows a layer constitution of a magnetic recording medium of the present embodiment. A glass substrate, to which an alkaline cleaning was performed, having a diameter of 2.5 inches was used as a substrate 11, and a soft magnetic underlayer 12, an intermediate layer 13, a perpendicular recording layer 14 and a protective layer 15 were sequentially formed by DC magnetron sputtering method.

An Fe-8at%Ta-12at%C target for the soft magnetic underlayer 12; a Ni-37.5at%Ta-10at%Zr target for the intermediate layer 13; a Co-22at%Cr-10at%Pt target, a Co-22at%Cr-12at%Pt target and a Co-22at%Cr-14at%Pt target for the perpendicular recording layer 14; and a carbon target for the protective layer 15 were used respectively. Film forming was performed under the conditions that an Ar gas pressure was set at 0.5 Pa, the soft magnetic underlayer 12 was formed, and then annealing by an infrared lamp heater at 1600 w for 12 s was performed (a substrate reaching temperature: about 450 to 500° C.). The substrate temperature when the perpendicular magnetic recording layer 14 was formed was about 270° C. The film thickness of each layer was: 474 nm for the soft magnetic underlayer 12; 2 nm to 30 nm for the intermediate layer 13; 20 nm for the perpendicular recording layer 14; and 5 nm for the protective layer 15. The lubricant layer 16 was formed by coating a perfluoroalkylpolyether which was diluted by fluorocarbon.

Figure 2:
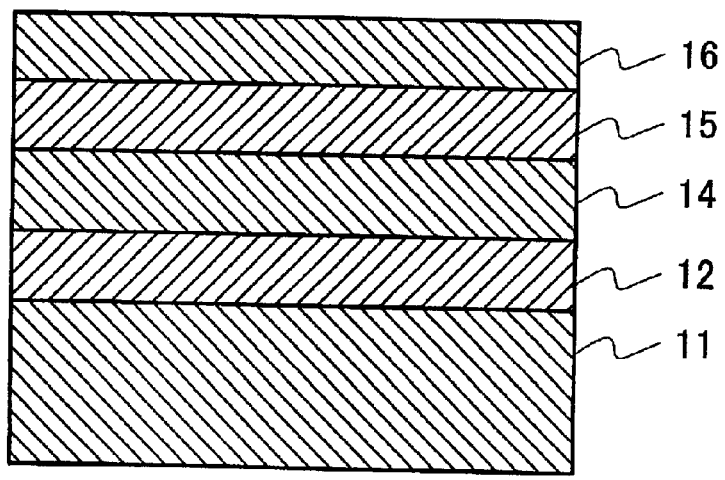
FIG. 2 is a view illustrating a layer constitution of the perpendicular magnetic recording medium of a comparative example.

In addition, as a comparative example 1, a medium, where the perpendicular magnetic recording layer 14 was directly formed on the soft magnetic underlayer 12, was fabricated under the film forming conditions similar to the present embodiment as shown in FIG. 2. In FIG. 2, the same numbers were given to layers corresponding to the ones shown in FIG. 1. Further, as a comparative example 2, a medium, where a Ti-10at%Cr target was used for the intermediate layer 13 with the layer constitution similar to the present embodiment, was fabricated under the film forming conditions similar to the present embodiment.

Firstly, a sample, in which only the soft magnetic underlayer was formed on the glass substrate by using the Fe-8at%Ta-12at%C target, was used to examine the microstructure of the Fe—Ta—C film by the thin-film X-ray diffraction (a Cu—K a ray was used, an X-ray incident angle θ:2 degrees) and a transmission electron microscope (TEM).

Figure 3:
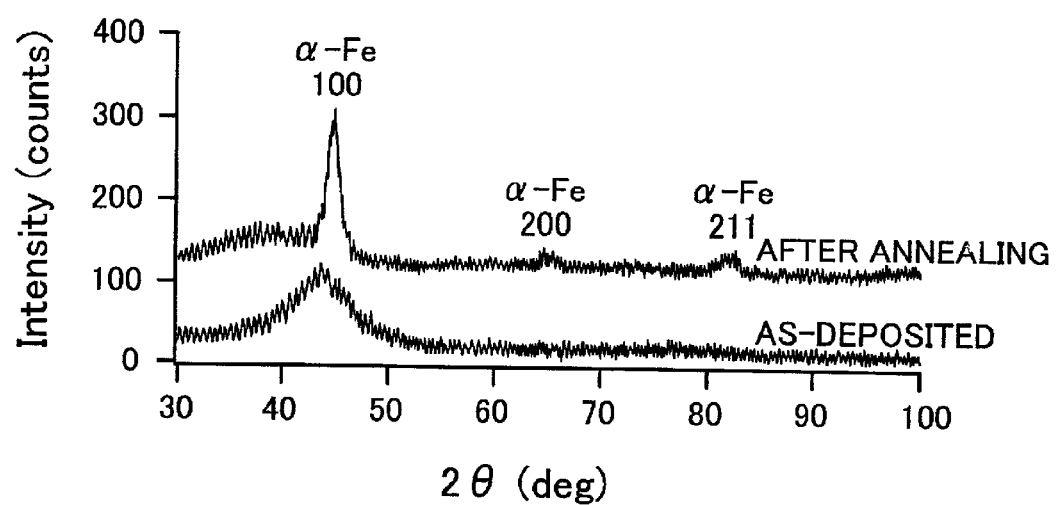
FIG. 3 is a graph showing a thin-film X-ray diffraction pattern of a Fe—Ta—C film.

As a result of the analysis of the thin-film X-ray diffraction, as shown in FIG. 3, a broad peak was seen in the vicinity of 43 degrees before annealing. After annealing, a diffraction peak 110, a diffraction peak 200 and a diffraction peak 211 of the α-Fe were confirmed.

Figure 4A:
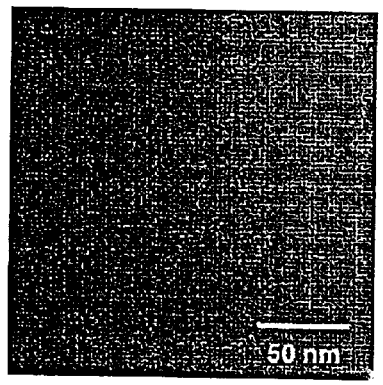
FIGS. 4A to 4F are views showing plan-view TEM images and electron diffraction patterns of the Fe—Ta—C film.
Figure 4B:
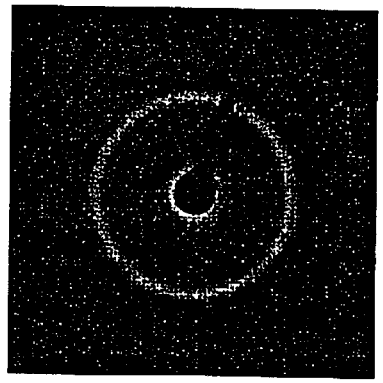
Figure 4C:
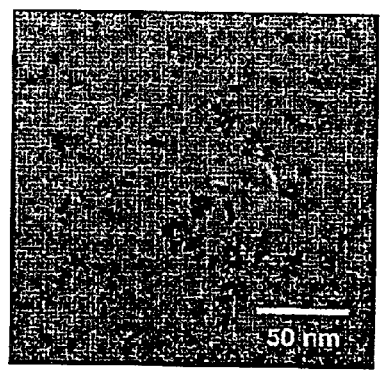
Figure 4D:
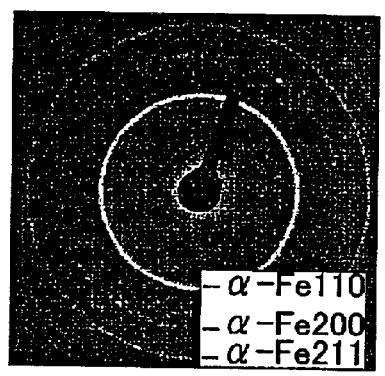
Figure 4E:
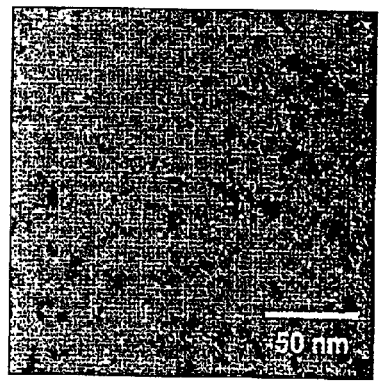
Figure 4F:
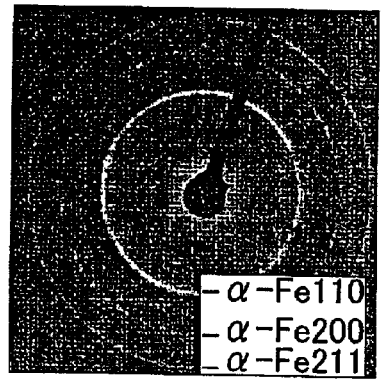

FIGS. 4A to 4F show observation results by the TEM. FIGS. 4A, 4C and 4E show bright field images of the TEM, and FIGS. 4B, 4D and 4F show the electron diffraction patterns. FIGS. 4A and 4B are the observation results before annealing, FIGS. 4C and 4D are the observation results of the Fe—Ta—C film after annealing by allowing the electron beam to be incident perpendicularly to the film surface, and FIGS. 4E and 4F are the observation results of the Fe—Ta—C film after annealing by allowing the electron beam to be incident parallel to the film surface.

As shown in the figures, before annealing, there was no contrast in the bright field image (FIG. 4A) of the plan-view TEM, and the halo pattern was seen in the electron diffraction pattern (FIG. 4B). After annealing, a nano-crystal contrast was seen in the bright field image (FIG. 4C), and a diffraction ring 110, a diffraction ring 200 and a diffraction ring 211 of the α-Fe were seen in the electron diffraction pattern (FIG. 4D). In addition, when a cross section of the Fe—Ta—C film after annealing was observed by the TEM, the nano-crystal contrast (FIG. 4E) similar to that of the bright field image of the plan-view TEM was seen, and the diffraction ring 110, the diffraction ring 200 and the diffraction ring 211 of the α-Fe were seen in the electron diffraction pattern (FIG. 4F).

From the above results, it can be seen that the Fe—Ta—C film used as the soft magnetic underlayer is amorphous at the time of film forming, and that the Fe—Ta—C film has the microstructure in which the α-Fe nano-crystals are precipitated by annealing. The saturation magnetic flux density (Bs) of the Fe—Ta—C film having such a microstructure was 0.5 tesla (T) before annealing, but significantly increased to 1.6 T after annealing. The change of the Bs is caused by the fact that the α-Fe nano-crystals with a larger saturation magnetization were precipitated by annealing. Note that annealing used in the present embodiment is for precipitating the α-Fe nano-crystals, and its condition depends on the material and the composition to be used for the soft magnetic underlayer.

Figure 5:
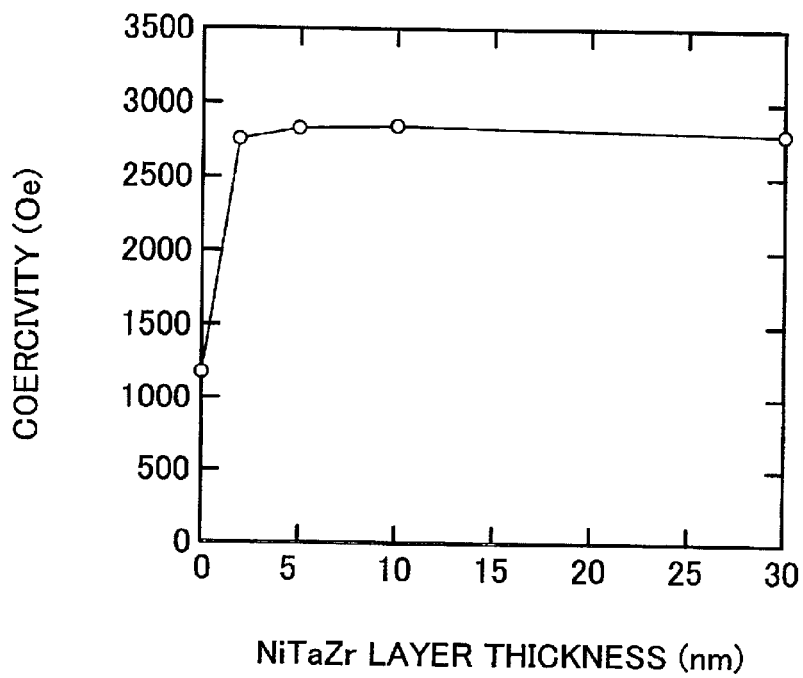
FIG. 5 is a graph showing a relation between a perpendicular coercivity and a film thickness of an intermediate layer.
Figure 6:
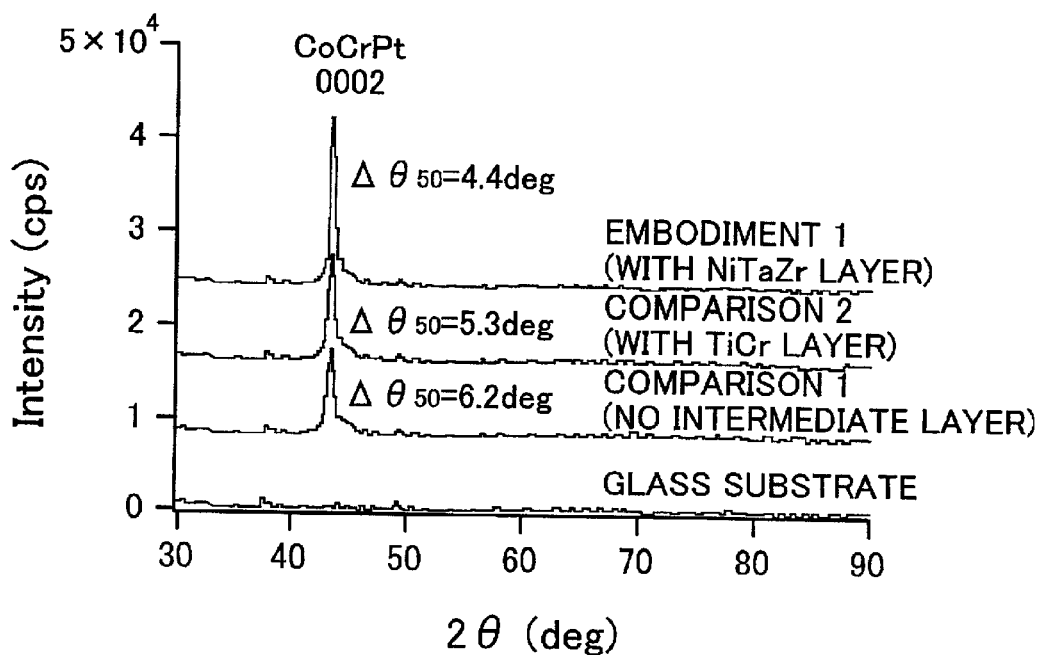
FIG. 6 is a graph showing X-ray diffraction patterns (θ–2θscan) of the perpendicular magnetic recording medium.

FIG. 5 shows results of a perpendicular coercivity (Hc) of the medium of the present embodiment, in which the Co-22at%Cr-14at%Pt film was used as the perpendicular magnetic recording layer, and the medium of the comparative example 1, measured by a Kerr-effect magnetometer. In the medium of the comparative example 1, in which the perpendicular magnetic recording layer was directly formed on the soft magnetic underlayer, the Hc was about 1.2 kOe that is low. However, in the medium of the present embodiment, a high Hc of about 2.8 kOe was obtained by forming the intermediate layer having the film thickness of 2 nm, and the change of the Hc due to the film thickness of the intermediate layer was small. The c-axis vertical orientation of the medium of the present embodiment, in which the film thickness of the intermediate layer was set at 5 nm, was examined by the X-ray diffraction. As shown in FIG. 6, in a θ–2θ scan, a strong diffraction peak 0002 of the Co—Cr—Pt film was observed, A $\Delta\theta_{50}$ of the Co diffraction peak 0002 calculated from a θ scan was 4.4 degrees. Although the diffraction peak 0002 of the Co—Cr—Pt film was also observed in the media of the comparative examples 1 and 2, the peak intensities thereof were smaller than that of the medium of the present embodiment, and A $\Delta\theta_{50}$ of the comparative examples were larger than that of the medium of the present embodiment. Accordingly, the perpendicular orientation of the perpendicular magnetic recording layer can be improved by the use of the Ni—Ta—Zr film having the film thickness of 5 nm for the intermediate layer. As a result, a strong perpendicular magnetic anisotropy is obtained. Note that the description has been made by taking the Co-22at%Cr-14at%Pt film to be used for the perpendicular magnetic recording layer as an example, but similar results were obtained in the cases where the Co-22at%Cr-12at%Pt film and the Co-22at%Cr-10at%Pt film were used.

Figure 7:
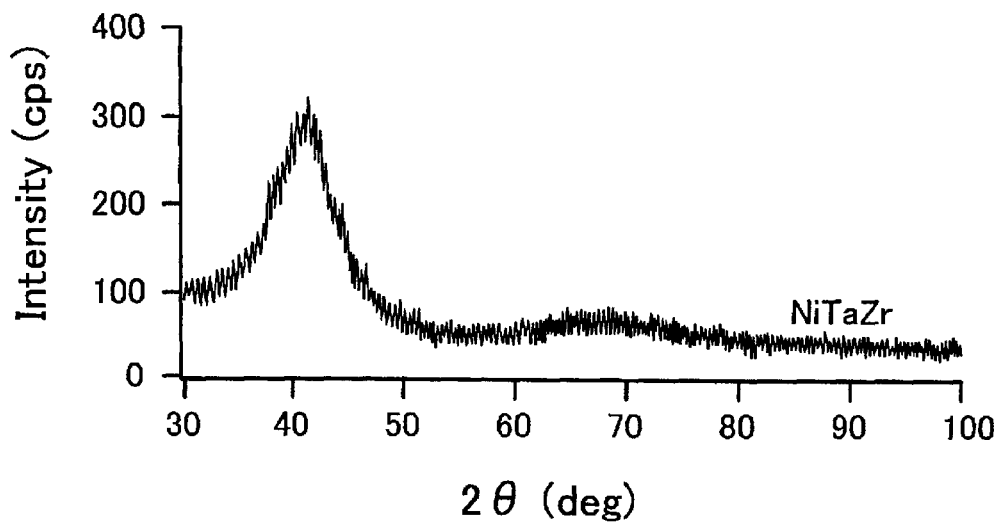
FIG. 7 is a graph showing the thin-film X-ray diffraction pattern of an Ni—Ta—Zr film.

Next, to make it clear a primary factor of such a superior property of the Ni—Ta—Zr film, a sample, in which only the Ni—Ta—Zr film was formed on the glass substrate, was used to examine the microstructure of the Ni—Ta—Zr film by the thin-film X-ray diffraction (a Cu—Kα ray was used, an X-ray incident angle θ:2 degrees) and an atomic force microscope (AFM). As shown in FIG. 7, a broad peak peculiar to the amorphous material was seen in the Ni—Ta—Zr film in the vicinity of 41 degrees, and roughness of a grain state was not observed on the surface of the Ni—Ta—Zr film and the surface morphology was flat. Such a microstructure of the Ni—Ta—Zr film is considered to have contributed to improving the perpendicular orientation of the perpendicular magnetic recording layer.

A recording-reproduction property of the medium of the present embodiment and the medium of the comparative example 2 were evaluated by using the magnetic head of the recording-reproduction separate-type. A gap length of the ring head for recording at 0.3 μm; a recording track width at 1.7 μm; a shield space of the GMR head for reproduction at 0.16 μm; reproduction track width at 1.3 μm; and a flying height at 20 nm were set respectively. A reproduction output (Slf) of 20 kFCI and the medium noise (N) of 200 kFCI were used, and the medium S/N ratio was evaluated by a ratio (Slf/N) thereof. The results are shown in Table 1.

TABLE 1

|  | Target composition of intermediate layer | Target composition of perpendicular magnetic recording layer | Medium S/N ratio (dB) |
| --- | --- | --- | --- |
| Embodiment 1 | Ni-37.5at%Ta-10at%Zr | Co-22at%Cr-10at%Pt | 29.6 |
| Embodiment 1 | Ni-37.5at%Ta-10at%Zr | Co-22at%Cr-12at%Pt | 30.6 |
| Embodiment 1 | Ni-37.5at%Ta-10at%Zr | Co-22at%Cr-14at%Pt | 30.8 |
| Comparative example 2 | Ti-10at%Cr | Co-22at%Cr-10at%Pt | 20.1 |
| Comparative example 2 | Ti-10at%Cr | Co-22at%Cr-12at%Pt | 23.8 |
| Comparative example 2 | Ti-10at%Cr | Co-22at%Cr-14at%Pt | 30.6 |

As can be clearly seen from Table 1, good medium S/N ratios were obtained for the media of the present embodiment irrespective of the composition of the perpendicular magnetic recording layer. However, with regard to the media of the comparative example 2, the medium S/N ratio was considerably degraded except for the case where the Co-22at%Cr-14at%Pt film was used for the perpendicular magnetic recording layer. Thus, by using the amorphous Ni—Ta—Zr film for the intermediate layer, choices of materials to be used for the perpendicular magnetic recording layer increase.

Figure 8:
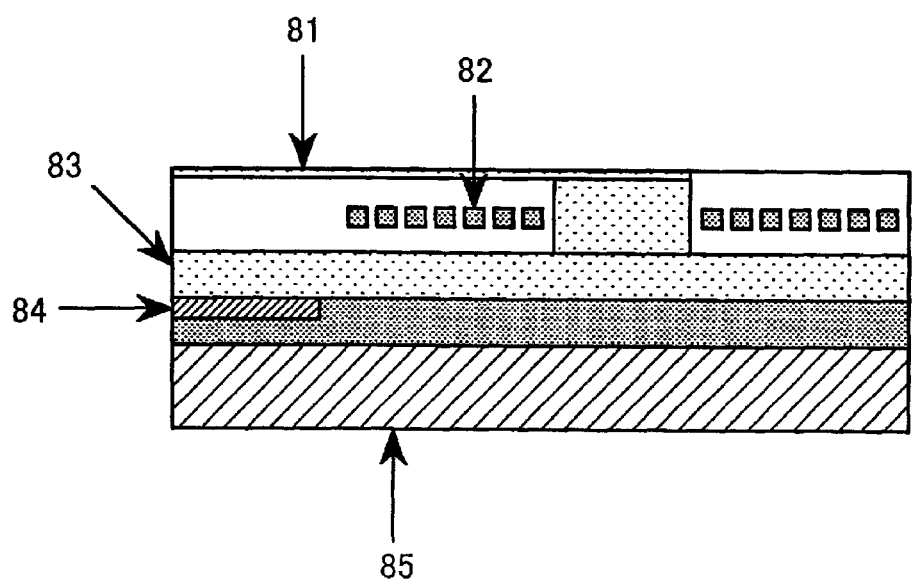
FIG. 8 is a cross-sectional schematic diagram of a recording-reproduction separate-type head.

A recording-reproduction test was performed by using the medium of the present embodiment, in which the Co-22at%Cr-14at%Pt film was used for the perpendicular magnetic recording layer, and the single pole type head with the track width of 0.25 μm for recording and the GMR head with the shield space of 0.08 μm and the track width of 0.22 μm for reproduction, under the condition that the head flying height was set at 10 nm. Reproduction waveforms of the signal were subjected to an error rate evaluation through an EEPR4 series signal processing circuit, and an error rate vale of $10^{-6}$ or less under the condition of an areal recording density at 50 Gb/in$^2$ was obtained. Note that the recording-reproduction separate-type head used in the evaluation is the one having a widely known constitution which includes: a main magnetic pole 81; a recording coil 82; an auxiliary magnetic pole and upper shield 83; a GMR element 84 and a lower shield 85 as shown in FIG. 8.

[Embodiment 2]

In a layer constitution similar to the embodiment 1 (refer to FIG. 1), the intermediate layer 13 was formed and then exposed to a mixed gas atmosphere of 99%Ar-1%O$_2$ (0.36 Pa to 3.6 Pa) for 5 seconds. Thereafter, the perpendicular magnetic recording layer 14 and the protective layer 15 were sequentially formed by the DC magnetron sputtering method. The Fe-8at%Ta-12at%C target for the soft magnetic underlayer 12; the Ni-37.5at%Ta-10at%Zr target for the intermediate layer 13; the Co-22at%Cr-14at%Pt target for the perpendicular magnetic recording layer 14; and the carbon target for the protective layer 15 were used respectively. The film forming conditions and the film thickness of each layer are similar to the embodiment 1 except that the thickness of the intermediate layer is fixed at 5 nm.

The recording-reproduction property of the medium of the present embodiment was evaluated under the conditions similar to the embodiment 1 (the ring head recording/the GMR reproduction) The results are shown in Table 2.

TABLE 2

|  | Ar/O$_2$ mixed gas flow rate (sccm) | Ar/O$_2$ mixed gas pressure (Pa) | Medium S/N ratio (dB) |
| --- | --- | --- | --- |
| Embodiment 2 | 10 | 0.36 | 31.3 |
| Embodiment 2 | 30 | 1.1 | 31.7 |
| Embodiment 2 | 100 | 3.6 | 31.3 |

It was confirmed that the medium S/N ratio of the medium of the present embodiment was improved in comparison with the media in the embodiment 1. It is considered that Zr on the surface of the Ni—Ta—Zr film was selectively oxidized, the oxidized portion functioned as a site to control enlargement of grain diameters, and then the grain diameters of the perpendicular magnetic recording layer decreased.

A recording-reproduction test was performed by using the medium of the present embodiment, where the pressure of the mixed gas 99%Ar-1%O$_2$ was set at 1.1 Pa, and the single pole type head with the track width of 0.25 μm for recording and the GMR head with the shield space of 0.08 μm and the track width of 0.22 μm for reproduction, under the condition that a magnetic spacing was set at 20 nm. Reproduction waveforms of the signal were subjected to the error rate evaluation through the EEPR4 series signal processing circuit, and the error rate value of $10^{-6}$ or less under the condition of the areal recording density at 60 Gb/in$^2$ was obtained.

[Embodiment 3]

In a layer constitution similar to the embodiment 1 (refer to FIG. 1), the Fe-8at%Ta-12at%C target, the Fe-8at%Hf-12at%C target, the Fe-10at%Nb-12at%C target, the Fe-13at%Ti-12at%C target and the Fe-8at%Zr-12at%C target for the soft magnetic underlayer 12; the Ni-13.5at%Nb-10at%Zr target for the intermediate layer 13; the Co-22at%Cr-14at%Pt target for the perpendicular magnetic recording layer 14; and the carbon target for the protective layer 15 were used respectively. The film forming conditions, the film thickness of each layer and the lubricant layer 16 are similar to embodiment 1.

Samples, in each of which only the soft magnetic underlayer was formed on the glass substrate, were used to examine the crystallinity by the thin-film X-ray diffraction (a Cu—Kα ray was used, an X-ray incident angle θ:2 degrees). All the samples showed only broad peaks peculiar to the amorphous material before annealing. However, after annealing, a diffraction peak 110, a diffraction peak 200 and a diffraction peak 211 of the α-Fe were confirmed for all the samples. In other words, it can be seen that the materials used for the soft magnetic underlayer of the present embodiment are amorphous at the time of film forming, similarly to the Fe—Ta—C film shown in embodiment 1, and that the materials become to have the microstructure in which the α-Fe nano-crystals are precipitated by annealing.

Next, the c-axis vertical orientation of the media of the present embodiment was examined by the X-ray diffraction. In the θ-2θ scan, a strong diffraction peak 0002 of the Co—Cr—Pt film was observed regardless of the soft magnetic underlayer material. On the other hand, in the thin-film X-ray diffraction patterns (Cu—Kα ray was used, an X-ray incident angle θ:2 degrees) of the Ni—Nb—Zr film used as the intermediate layer, a broad peak peculiar to the amorphous material was seen similarly to the Ni—Ta—Zr film of the embodiment 1. Therefore, using the Ni—Nb—Zr film having the amorphous structure for the intermediate layer is effective in improving the perpendicular orientation of the perpendicular magnetic recording layer.

The recording-reproduction property of the media of the present embodiment were evaluated under the conditions (the ring head recording/the GMR reproduction) similar to the embodiment 1. The results are shown in Table 3. Although the medium S/N ratio is a little lower in the case where the Fe—Ti—C film was used for the soft magnetic underlayer, the medium S/N ratios substantially similar to the medium of embodiment 1 were obtained.

TABLE 3

| | Target composition of soft magnetic underlayer | Medium S/N ratio (dB) |
|---|---|---|
| Embodiment 3 | Fe-8at%Ta-12at%C | 30.6 |
| Embodiment 3 | Fe-8at%Hf-12at%C | 30.7 |
| Embodiment 3 | Fe-10at%Nb-12at%C | 30.4 |
| Embodiment 3 | Fe-13at%Ti-12at%C | 28.6 |
| Embodiment 3 | Fe-8at%Zr-12at%C | 30.4 |

A recording-reproduction test was performed by using the medium of the present embodiments in which the Fe—Hf—C film was used for the soft magnetic underlayer, the single pole type head with the track width of 0.25 μm for recording and the GMR head with the shield space of 0.08 μm and the track width of 0.22 μm for reproduction, under the condition that the head flying height was set at 10 nm. Reproduction waveforms of the signal were subjected to the error rate evaluation through the EEPR4 series signal processing circuit, and the error rate vale of $10^{-6}$ or less under the condition of an areal recording density at 50 Gb/in$^2$ was obtained.

[Embodiment 4]

In a layer constitution similar to the embodiment 1 (refer to FIG. 1), the Fe-10at%Ta target and the Fe-10at%Hf target for the soft magnetic underlayer 12; the Ni-37.5at%Ta-10at%Zr target for the intermediate layer 13; the Co-22at%Cr-14at%Pt target for the perpendicular magnetic recording layer 14; and the carbon target for the protective layer 15 were used respectively. Herein, the soft magnetic underlayer 12 was formed by an reactive sputtering method using the 90%Ar-10%N$_2$ mixed gas under the condition of the gas pressure at 0.5 Pa. The other film forming conditions, the film thickness of each layer and the lubricant layer 16 are similar to embodiment 1. In addition, as a comparative example 3, the media, in each of which the soft magnetic underlayer was formed using the 95%Ar-5%N$_2$ mixed gas, were fabricated under the film forming conditions similar to the present embodiment.

Samples, in each of which only the soft magnetic underlayer was formed on the glass substrate, were used to examine the crystallinity by the thin-film X-ray diffraction (a Cu—Kα ray was used, an X-ray incident angle θ:2 degrees). In the case where the 90%Ar-10%N$_2$ mixed gas was used, broad peaks peculiar to the amorphous material were seen for both the Fe—Ta—N film and the Fe—Hf—N film before annealing. After annealing, the diffraction peak 110, the diffraction peak 200 and the diffraction peak 211 of the α-Fe were confirmed. On the other hand, in the case where the 95%Ar-5%N$_2$ mixed gas was used, the diffraction peak 110 of the α-Fe was seen for both the Fe—Ta—N film and the Fe—Hf—N film before annealing, and the both films became crystallized at the time of film forming. As described, the microstructure of the film before annealing, which was formed by the reactive sputtering method using the Ar—N$_2$ mixed gas, changes from crystalline to amorphous state by increasing an N$_2$ concentration of the Ar—N$_2$mixed gas.

The recording-reproduction property of the media of the present embodiment and the media of the comparative example 3 were evaluated under the conditions (the ring head recording/the GMR reproduction) similar to the embodiment 1. The results are shown in Table 4. In the media of the present embodiment, the medium S/N ratios substantially similar to the medium of embodiment 1 and embodiment 3 were obtained. However, the medium S/N ratios were considerably degraded in the media of the comparative example 3. From this result, the soft magnetic underlayer that is amorphous at the time of film forming and has the microstructure in which the α-Fe nano-crystals are precipitated by annealing is considered to be effective in improving the medium S/N ratio.

TABLE 4

| | Target composition of soft magnetic underlayer | Ar/N$_2$ mixed gas composition | Medium S/N ratio (dB) |
|---|---|---|---|
| Embodiment 4 | Fe-10at%Ta | 90%Ar-10%N$_2$ | 30.2 |
| Embodiment 4 | Fe-10at%Hf | 90%Ar-10%N$_2$ | 29.8 |
| Comparative example 3 | Fe-10at%Ta | 95%Ar-5%N$_2$ | 24.5 |
| Comparative example 3 | Fe-10at%Hf | 95%Ar-5%N$_2$ | 24.2 |

A recording-reproduction test was performed by using the medium of the present embodiment, which the Fe—Ta—N film was used for the soft magnetic underlayer, and the single pole type head with the track width of 0.25 μm for recording and the GMR head with the shield space of 0.08 μm and the track width of 0.22 μm for reproduction, under the condition that the head flying height was set at 10 nm. Reproduction waveforms of the signal were subjected to the error rate evaluation through the EEPR4 series signal processing circuit, and the error rate vale of $10^{-6}$ or less under the condition of an areal recording density at 50 Gb/in$^2$ was obtained.

[Embodiment 5]

Figure 9A:
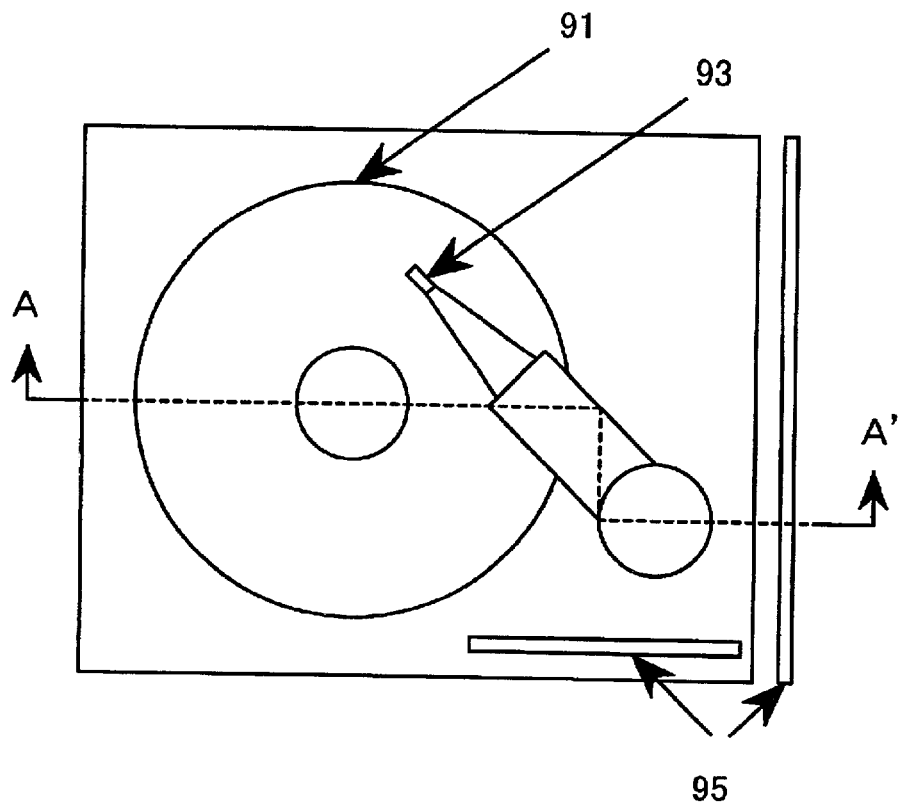
FIGS. 9A and 9B are a schematic plan view of a magnetic storage apparatus and an A–A' longitudinal sectional view thereof respectively.
Figure 9B:
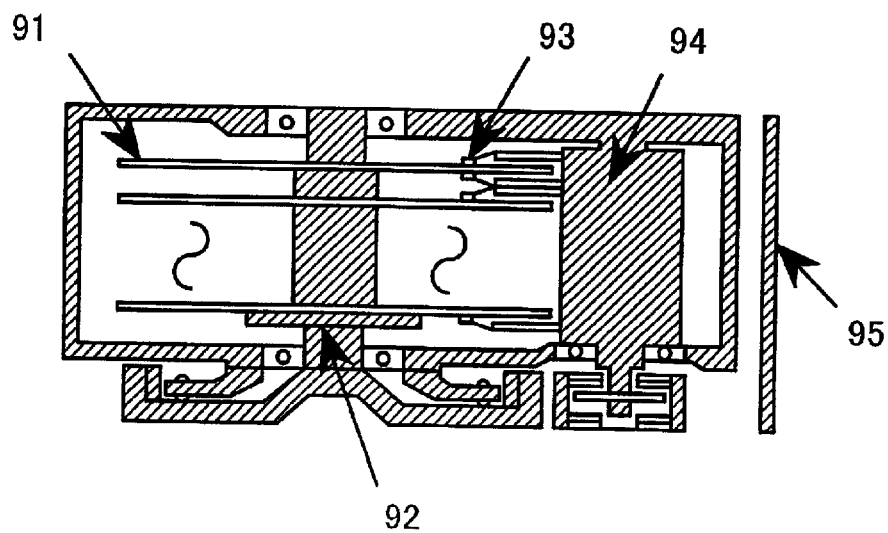

Description will be made for the magnetic storage apparatus of the present invention with reference to FIGS. 9A and 9B. FIG. 9A is a schematic plan view of the magnetic storage apparatus, and FIG. 9B is an A–A' longitudinal sectional view thereof. The apparatus is the magnetic storage apparatus having a widely known constitution which includes: a perpendicular magnetic recording medium 91; a driver 92 for driving to rotate the medium 91; a magnetic head 93; driving means 94 thereof; and means 95 for processing recording-reproduction signal of the magnetic head. The above-described magnetic head is a recording-reproduction separate-type magnetic head formed on a magnetic head slider. The track width of the single pole type recording head is 0.25 μm, the shield space of the GMR head for reproduction is 0.08 μm and the track width thereof is 0.22 μm.

The medium, which uses the Co-22at%Cr-14at%Pt film for the perpendicular magnetic recording layer in the embodiment 1, was incorporated in the above-described magnetic storage apparatus, and the recording-reproduction property was evaluated under the conditions that the head flying height was set at 10 nm, a linear recording density at 590 kBPI and a track density at 89 kTPI. As a result, the recording-reproduction property specification of the areal recording density of 52.5 Gb/in$^2$ was sufficiently satisfied in a temperature range between 10° C. and 50° C.

[Embodiment 6]

In a constitution similar to the magnetic storage apparatus of the embodiment 5, the medium in embodiment 2, which was exposed to the 99%Ar-1%O$_2$ mixed gas atmosphere at 1.1 Pa after forming the intermediate layer, was incorporated in the magnetic storage apparatus, which used a high-sensitive layer utilizing a tunneling magnetoresistive effect for the reproduction head. And then, the recording-reproduction property was evaluated under the conditions that the head flying height at 10 nm, the linear recording density at 674 kBPI and the track density at 89 kTPI were set respectively. As a result, the recording-reproduction property specification of the areal recording density of 60 Gb/in$^2$ was sufficiently satisfied.

Figure 10:
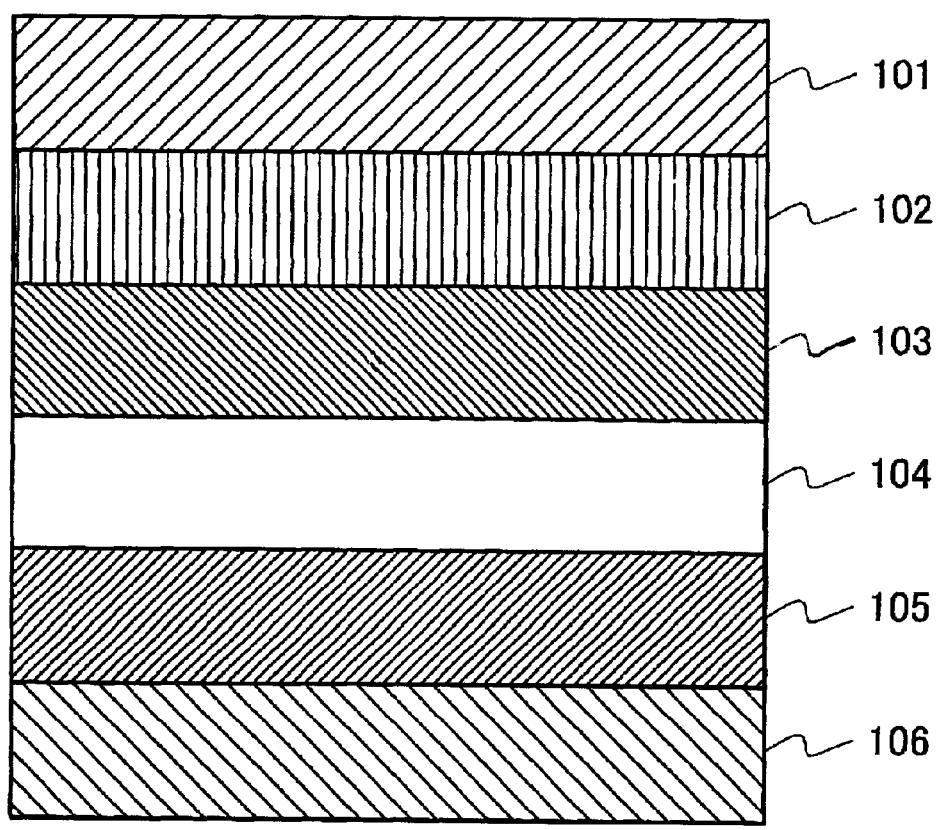
FIG. 10 is a view illustrating a layer constitution example of a high-sensitive layer utilizing a tunneling magnetoresistive effect.

Note that the high-sensitive sensor, which utilized the tunneling magnetoresistive effect, used in the evaluation is the one having a widely known constitution as shown in FIG. 10 including: an upper electrode 101; an antiferromagnetic layer 102; a pinned layer 103; an insulating layer 104; a free layer 105; and a lower electrode 106.

According to the present invention, the magnetic storage apparatus with a lower error rate and superior reliability at the recording density of 50 Gb/in$^2$ or higher can be achieved.

What is claimed is:

1. A perpendicular magnetic recording medium comprising:

a soft magnetic underlayer having α-Fe nano-crystals, which is formed on a substrate, a non-magnetic amorphous metal layer containing Ni, which is formed on the soft magnetic underlayer; and a perpendicular magnetic recording layer formed on the non-magnetic amorphous metal layer containing Ni, wherein said soft magnetic underlayer is formed as an amorphous film by sputtering, and formed as nano-crystalline film by annealing, wherein said soft magnetic underlayer contains Fe, Ta and C, and wherein said non-magnetic amorphous metal layer contains Ni, Ta and Zr.

* * * * *